(12) United States Patent
Benhase et al.

(10) Patent No.: US 9,063,945 B2
(45) Date of Patent: Jun. 23, 2015

(54) APPARATUS AND METHOD TO COPY DATA

(75) Inventors: Michael Thomas Benhase, Tucson, AZ (US); Lokesh Mohan Gupta, Tucson, AZ (US); Joseph Smith Hyde, II, Tucson, AZ (US); Warren Keith Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 13/160,397

(22) Filed: Jun. 14, 2011

(65) Prior Publication Data

US 2012/0324171 A1 Dec. 20, 2012

(51) Int. Cl.
*G06F 12/00* (2006.01)
*G06F 13/00* (2006.01)
*G06F 13/28* (2006.01)
*G06F 17/30* (2006.01)
*G06F 12/08* (2006.01)
*G06F 12/12* (2006.01)

(52) U.S. Cl.
CPC ...... *G06F 17/30115* (2013.01); *G06F 12/0866* (2013.01); *G06F 12/123* (2013.01); *G06F 2212/262* (2013.01); *G06F 17/30893* (2013.01)

(58) Field of Classification Search
CPC .................................................... G06F 12/08
USPC ................... 711/136, 118, E12.022
See application file for complete search history.

(56) References Cited

U.S. PATENT DOCUMENTS

| 6,738,865 B1 * | 5/2004 | Burton et al. ............ 711/133 |
| 8,086,792 B2 * | 12/2011 | Jarvis et al. ............ 711/113 |
| 2004/0181640 A1 * | 9/2004 | Factor et al. ............ 711/162 |
| 2006/0080510 A1 * | 4/2006 | Benhase et al. ............ 711/136 |
| 2007/0186047 A1 * | 8/2007 | Jarvis et al. ............ 711/136 |
| 2009/0063776 A1 * | 3/2009 | Williams ............ 711/136 |
| 2009/0144506 A1 * | 6/2009 | Barth et al. ............ 711/129 |
| 2010/0318744 A1 | 12/2010 | Benhase et al. |

* cited by examiner

*Primary Examiner* — Sheng-Jen Tsai
(74) *Attorney, Agent, or Firm* — Dale F. Regelman; Quarles & Brady LLP

(57) ABSTRACT

An apparatus and method for copying data are disclosed. A data track to be replicated using a peer-to-peer remote copy (PPRC) operation is identified. The data track is encoded in a non-transitory computer readable medium disposed in a first data storage system. At a first time, a determination of whether the data track is stored in a data cache is made. At a second time, the data track is replicated to a non-transitory computer readable medium disposed in a second data storage system. The second time is later than the first time. If the data track was stored in the data cache at the first time, a cache manager is instructed to not demote the data track from the data cache. If the data track was not stored in the data cache at the first time, the cache manager is instructed that the data track may be demoted.

20 Claims, 6 Drawing Sheets

APPARATUS AND METHOD TO COPY DATA

FIELD OF THE INVENTION

This invention relates to an apparatus and method to copy data. In certain embodiments, the invention is directed to use a data cache for peer-to peer data transfer.

BACKGROUND OF THE INVENTION

Data storage and retrieval systems are used to store and retrieve information on behalf of one or more host computer system. Such data storage and retrieval systems receive requests from a host computer system to write information to one or more secondary storage devices, and requests to retrieve information from those one or more secondary storage devices. Upon receipt of a write request, the system stores information received from a host computer in a data cache, the cached copy can than be written to other storage devices connected to the system, such as connected nonvolatile storage devices. Upon receipt of a read request, the system recalls one or more data tracks from the one or more secondary storage devices and moves those tracks to the data cache.

When tracks or data are accessed from the storage device they are typically first loaded into cache before being returned to the application or device requesting the data. Because the accessed data remains in cache, a subsequent request for the data can be returned from cache rather than the storage device, which can be substantially faster than retrieving the data from the storage device. Returning data from cache, referred to as a cache hit, improves performance and system throughput because a cache memory provides faster access to data than many nonvolatile storage devices such as tapes, hard-drives, or optical disks. A cache may also provide faster access to a main volatile memory, such as a random access memory (RAM). For instance, many processors include an "on-board" cache that caches data from RAM for the processor to use and subsequently access from the faster cache memory. In both cases, disk caching and memory caching, the cache provides a high speed memory from which data may be returned more efficiently than the storage device or main memory where the data is maintained.

After the cache utilization reaches a certain upper limit, the cache manager will demote data from cache to make room for subsequently accessed tracks. Areas of cache marked as demoted may then be overwritten by new data, making room for data more recently accessed from storage devices.

In some storage systems, a least recently used (LRU) algorithm is used to manage cached data and determine which tracks are demoted. A linked list stores a record of when particular tracks stored in cache were last accessed. When a track is added to cache, a pointer to the track in cache is placed at a top of the LRU linked list indicating that the track has been accessed recently (i.e., the track becomes a most recently used (MRU) track). If a track already in cache is again accessed, then the pointer to that track in cache is placed at the top of the LRU list. When the cache manager determines that data must be demoted or removed from cache to make room for subsequent data accesses, the cache manager will demote tracks whose pointers are at the bottom of the LRU list, representing those tracks that were accessed the longest time ago as compared to other tracks in cache.

Although the above LRU-based caching implementation can be useful in many applications, in remote copy or replication systems, existing LRU algorithms can cause suboptimal cache performance by causing wanted files to be prematurely removed from cache resulting in a poor cache hit ratio.

When replicating a volume using, for example, asynchronous peer to peer remote copying (PPRC), after the PPRC transfer to secondary storage is complete, a PPRC agent accesses the track a final time to specify that the track is demotable. This causes the DEMOTABLE bit for the track to be set and the track to be removed from cache shortly after the PPRC transfer is complete. This behavior is designed to remove tracks from cache that were inserted into cache solely for the remote copy process and otherwise wouldn't be stored in cache and are unlikely to be accessed again. In some cases, though, tracks are resident in cache before PPRC begins (e.g., because there were recently accessed by another application). In that case, it is inefficient to remove the tracks from cache after PPRC is complete, as they may be tracks that are regularly accessed by other applications.

As such, there is a need in the art to improve cache management during remote copy or duplication (or any other systems that copy data from a first storage device to a second storage device) to improve performance and data throughput.

SUMMARY OF THE INVENTION

A method to copy data is presented. The method identifies a data track to be replicated using a peer-to-peer remote copy (PPRC) operation, wherein the data track is encoded in a non-transitory computer readable medium disposed in a first data storage system. The method, at a first time, determines whether the data track is stored in a data cache, and at a second time, replicates the data track from the data cache to a non-transitory computer readable medium disposed in a second data storage system, wherein the second time is later than the first time. If the data track was stored in the data cache at the first time, the method instructs a cache manager to not demote the data track from the data cache. However, if the data track was not stored in the data cache at the first time, the method instructs the cache manager that the data track may be demoted.

An article of manufacture is presented, wherein the article of manufacture comprises computer readable program code disposed therein to manage data in a data cache, the computer readable program code comprising a series of computer readable program steps to effect identifying a data track to be replicated using a peer-to-peer remote copy (PPRC) operation, wherein the data track is encoded in a non-transitory computer readable medium disposed in a first data storage system. The article of manufacture further comprises a series of computer readable program steps to effect at a first time, determining whether the data track is stored in a data cache, and at a second time, replicating the data track from the data cache to a non-transitory computer readable medium disposed in a second data storage system, wherein the second time is later than the first time.

The article of manufacture further comprises a series of computer readable program steps to effect instructing a cache manager to not demote the data track from the data cache if the data track was stored in the data cache at the first time, instructing the cache manager that the data track may be demoted if the data track was not stored in the data cache at the first time.

A computer program product is presented, wherein the computer program product comprises computer readable program code which causes a programmable computer processor to identify a data track to be replicated using a peer-to-peer remote copy (PPRC) operation, wherein the data track is encoded in a non-transitory computer readable medium disposed in a first data storage system. The computer program product further comprises computer readable program code which causes a programmable computer processor to, at a first time, determine whether the data track is stored in a data cache, and at a second time, replicate the data track from the data cache to a non-transitory computer readable medium disposed in a second data storage system, wherein the second time is later than the first time.

The computer program product further comprises computer readable program code which causes a programmable computer processor to instruct a cache manager to not demote the data track from the data cache if the data track was stored in the data cache at the first time, and to instruct the cache manager that the data track may be demoted if the data track was not stored in the data cache at the first time.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 6:
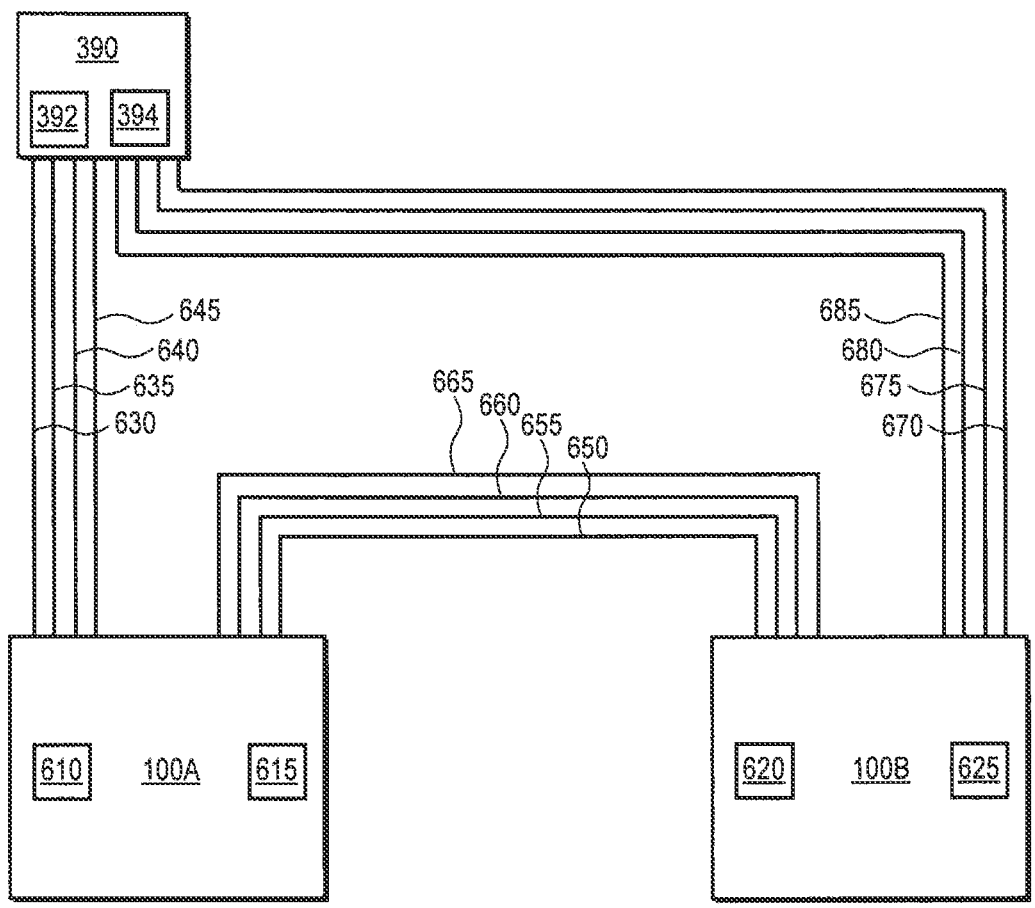
FIG. 6 illustrates Applicants' peer-to-peer copy data storage system.

Some of the functional units described in this specification have been labeled as modules (e.g., PPRC agent, 610, 620, and 392, and cache manager 615, 625, and 394 of FIG. 6) in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically collocated, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
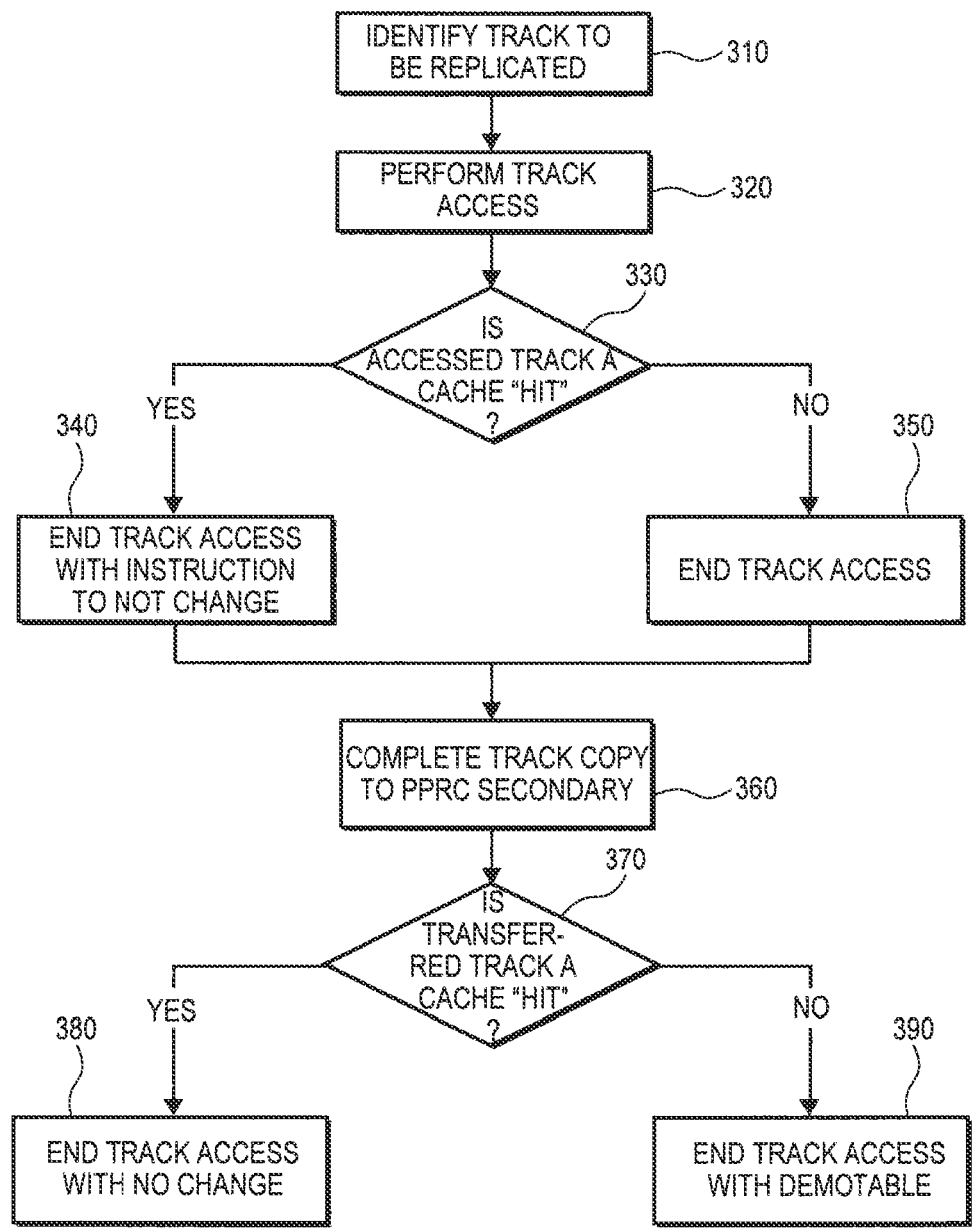
FIG. 3 is a flowchart illustrating an example method for performing data transfer while utilizing a data cache in accordance with the present disclosure.
Figure 4:
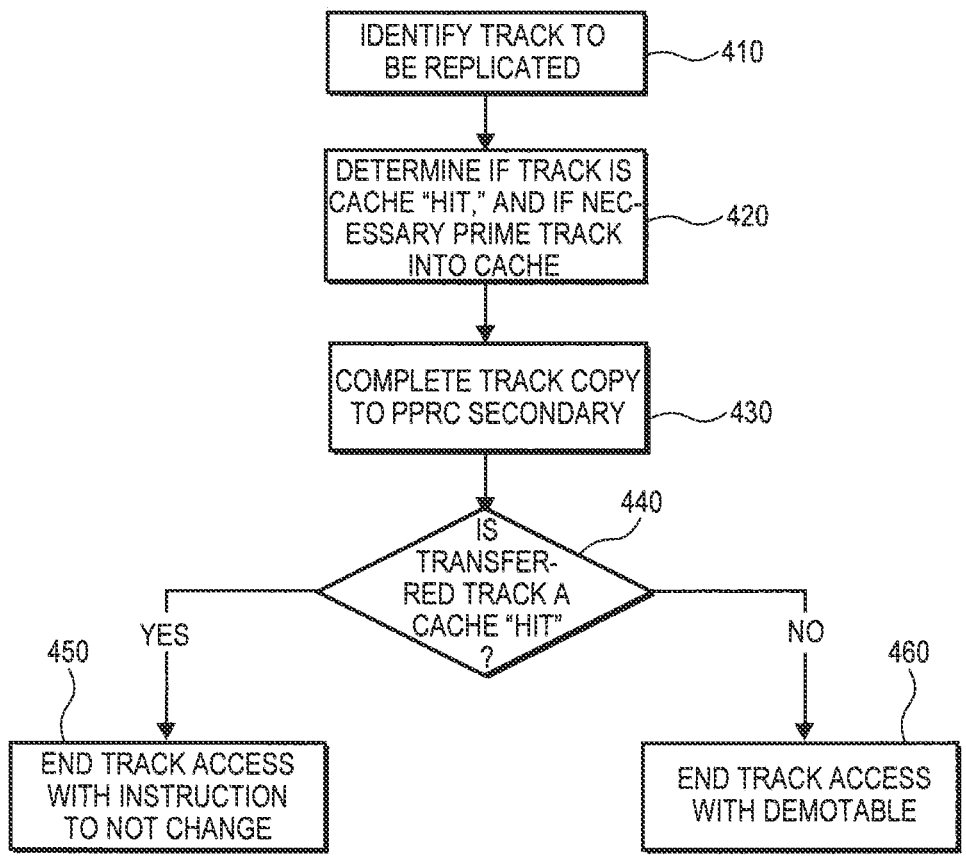
FIG. 4 is a flowchart illustrating an alternative method for performing data transfer while utilizing a data cache in accordance with the present disclosure.
Figure 5:
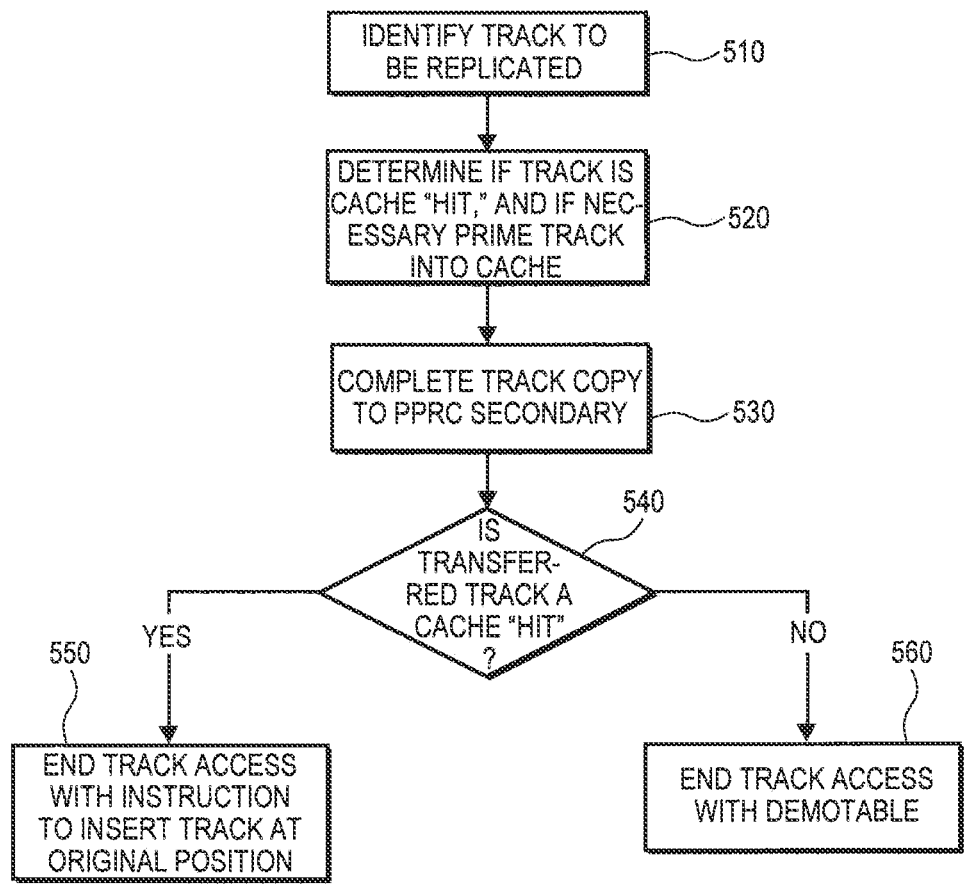
FIG. 5 is a flowchart illustrating a second alternative method for performing data transfer while utilizing a data cache in accordance with the present disclosure.

The schematic flow chart diagrams included are generally set forth as logical flow-chart diagrams (e.g., FIGS. 3, 4, 5). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 3, 4, 5). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The invention will be described as embodied in an data storage system which includes two data storage devices or clusters, a plurality of host adapters, a plurality of device adapters, and a data cache. The following description of Applicant's method to implement improved cache management for file transfer is not meant, however, to limit Applicant's invention to data processing applications, as the cache management algorithm and system described herein can be applied to data caching systems in a wide variety of applications including, without limitation, storage systems, databases, Web servers, middleware, processors, file systems, disk drives, RAID controllers, operating systems, and the like.

Figure 1:
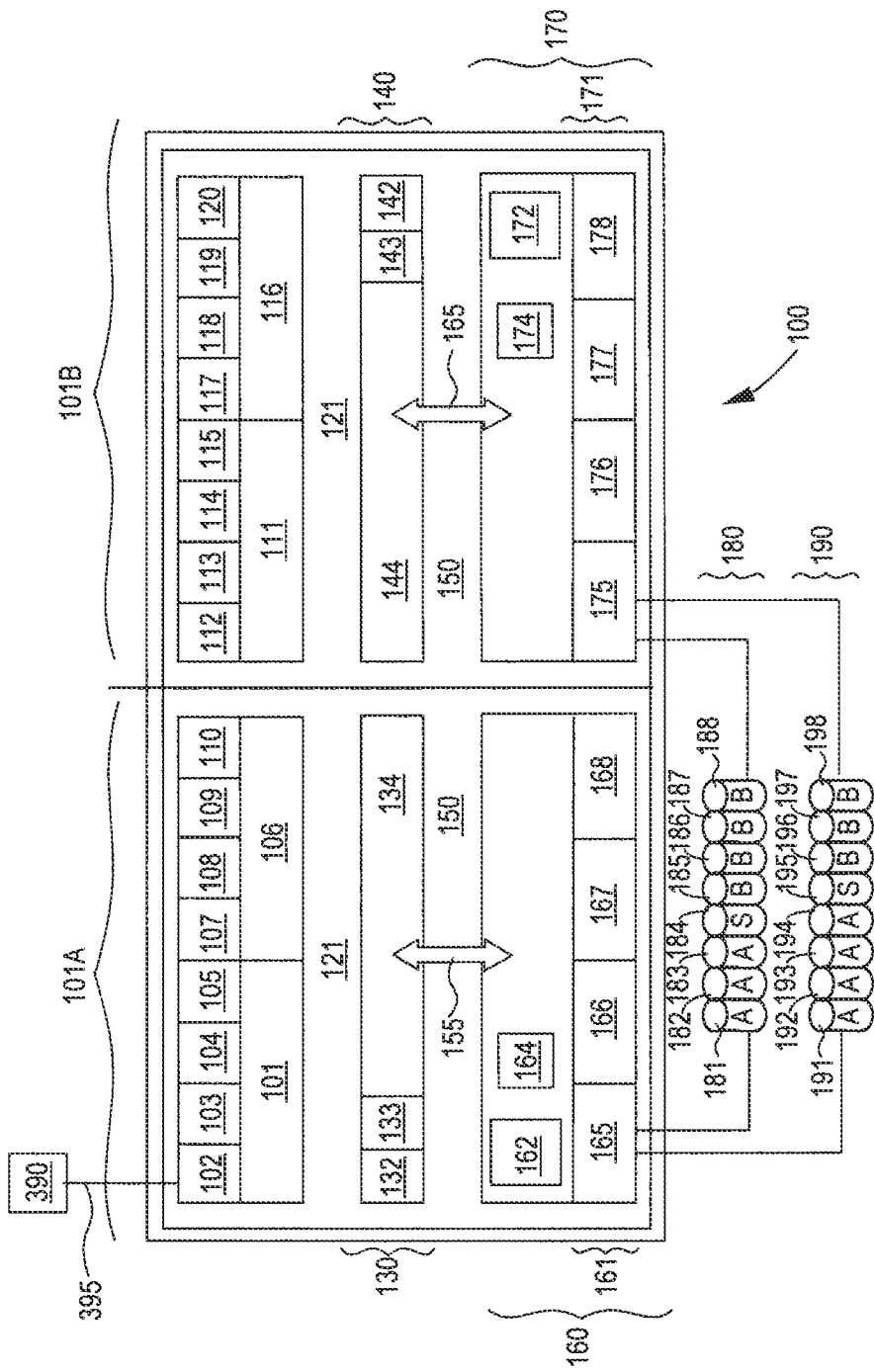
FIG. 1 is a block diagram showing the components of Applicants' data storage and retrieval system.

Referring now to FIG. 1, data storage system 100 is capable of communication with host computer 390 via communication link 395. The illustrated embodiment of FIG. 1 shows a single host computer. In other embodiments, data storage system 100 is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark owned by Linus Torvalds). In certain implementations, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' data storage system 100 includes a plurality of host adapters 102-105, 107-110, 112-115, and 117-120, disposed in four host bays 101, 106, 111, and 116. Each host adapter is connected to both subsystems through one or more Common Platform Interconnect buses 121 and 150 such that each subsystem can handle I/O from any host adapter. Internal buses in each subsystem are connected via Remote I/O bridges 155 and 165 between the processor portions 130 and 140 and I/O portions 160 and 170, respectively. In some implementations, Applicants' data storage system includes a different number of host adapters. Generally, each host adapter comprises a shared resource that has equal access to both central processing/cache elements 130 and 140 of the system. Each host adapter may comprise one or more Fibre Channel ports, one or more FICON ports, one or more ESCON ports, or one or more SCSI ports, for example.

Processor portion 130 includes processor 132 in communication with cache 134. In certain embodiments, processor portion 130 further includes memory 133 in which cache 134 may, in some implementations, reside. In certain embodiments, memory 133 comprises RAM. Alternatively, memory device 133 may include non-volatile memory.

Processor portion 140 includes processor 142 in communication with cache 144. In certain embodiments, processor portion 140 further includes memory 143 in which cache 144 may, in some implementations, reside. In certain embodiments, memory 143 comprises RAM. Alternatively, memory 143 may include non-volatile memory.

I/O portion 160 comprises a plurality of device adapters, such as device adapters 165, 166, 167, and 168. I/O portion 160 further comprises nonvolatile storage ("NVS") 162 and battery backup 164 for NVS 162.

I/O portion 170 comprises a plurality of device adapters, such as device adapters 175, 176, 177, and 178. I/O portion 170 further comprises NVS 172 and battery backup 174 for NVS 172.

In certain embodiments of the present system, one or more host adapters 101A, processor/cache portion 130, and one or more device adapters 161, are packaged together on a single card disposed in Applicants' data storage system. Similarly, in certain embodiments, one or more host adapters 101B, processor/cache portion 140, and one or more device adapters 171, are disposed on another card disposed in the data storage system. In these embodiments, system 100 includes two cards interconnected with a plurality of data storage devices.

In the illustrated data storage system 100 of FIG. 1, sixteen data storage devices are organized into two arrays, namely array 180 and array 190. Although in FIG. 1, storage arrays 180 and 190 are proximate to one another, in some implementations, one or more of the arrays may be remotely located. For example, storage array 180 may be connected directly to computer system 390, while storage array 190 may be many hundreds of miles away. In one PPRC implementation, storage array 180 may be consider the PPRC primary storage device, while array 190 may be considered the PPRC secondary storage device.

The illustrated embodiment of FIG. 1 shows two storage device arrays. In other embodiments, however, Applicants' system includes a single storage device array. In still other embodiments, Applicants' data storage system includes more than two storage device arrays. Each storage array appears to a host computer as one or more logical devices.

In certain embodiments, arrays 180 and 190 use a RAID protocol. In certain embodiments, arrays 180 and 190 comprise what is sometimes called a JBOD array, i.e. "Just a Bunch Of Disks" where the array is not configured according to RAID. As those skilled in the art will appreciate, a RAID (Redundant Array of Independent Disks) system includes independent disk drives configured in an array of disk drives to obtain performance, capacity and/or reliability that exceeds that of a single large drive.

A publication entitled IBM TotalStorage Enterprise Storage Server Implementing ESS Copy Services with IBM eServer zSeries (hereinafter the "Red Book"), September 2003, describes various copy services, and is hereby incorporated by reference herein. Such copy services include, for example, peer-to-peer remote copy, sometimes referred to as PPRC (Red Book Chapters 2 and 4), Peer-to-Peer Remote Copy Extended Distance (Red Book Chapter 3), Extended Remote Copy (Red Book Chapter 5), Flash Copy (Red Book Chapters 6 and 7), and Concurrent Copy (Red Book Chapter 8).

Based upon actual or anticipated host computer requests, data storage system 100 moves tracks from the data cache to one or more storage devices, and from the one or more storage devices to the data cache. A "stage operation" comprises moving one or more tracks from a storage device to the cache in response to a host request. For certain read operations, a cache manager (e.g., cache manager 615, 625, or 394 of FIG. 6) running on system 100 will "prestage" information, i.e. anticipate a host request.

In one implementation of data storage system 100, data written to Applicants' data storage and retrieval system by a host computer is first received by a host adapter, such as host adapter 102 (FIG. 1), and is transferred first to NVS, such as NVS 172 (FIG. 1). A copy of that data is held in the host adapter buffer. The host is notified that the I/O operation is complete as soon as the data is in NVS. The host adapter, once the NVS transfer is complete, then transfers the data to the cache. The data remains in the cache and NVS until it is "destaged." In certain embodiments, destaging is triggered by cache and NVS usage thresholds.

A destage operation includes moving tracks from cache to a storage device. In an LRU destage operation, cache space is released according to LRU algorithms. As those skilled in the art will appreciate, an LRU algorithm determines when the data tracks residing in the cache were last accessed. Generally, tracks that were most recently accessed are kept in cache, while tracks that have not been accessed recently are preferentially destaged.

Figure 2:
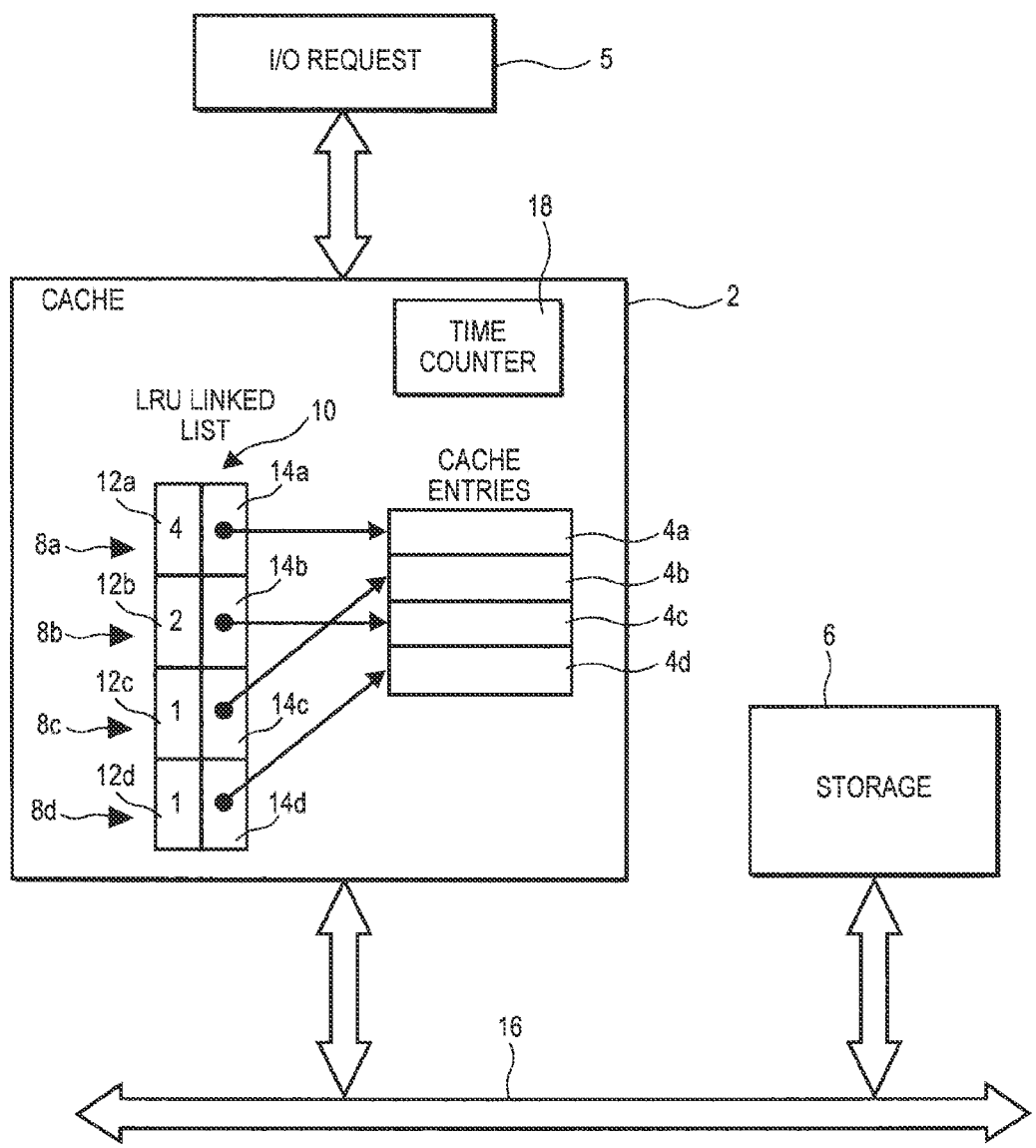
FIG. 2 illustrates an example cache architecture that is configured to implement an LRU table to determine which tracks are to remain in cache and which tracks are to be demoted.

FIG. 2 illustrates an example cache architecture that may be used in accordance with the present system. In this example, a Cache Manager module (e.g., cache manager 615, 625, or 394 of FIG. 6) is configured to implement an LRU table to determine which tracks are to remain in cache and which tracks are to be demoted. The architecture shown in FIG. 2 may be incorporated into caches 134 or 144 of FIG. 1 and may be executed by processors 132 or 142, for example.

Referring to FIG. 2, at a first time, cache 2 includes cache entries 4a, 4b, 4c, 4d into which tracks or pages of data from storage 6 may be placed. When a track or page of data is staged into a cache entry 4a, 4b, 4c, 4d a new entry 8a is added to the top of the LRU linked list 10. For each cache entry 4a, 4b, 4c, 4d the LRU linked list 10 includes one entry 8a, 8b, 8c, 8d. Each entry 8a, 8b, 8c, 8d in the LRU linked list 10 includes a LRU rank value 12a, 12b, 12c, 12d and pointer 14a, 14b, 14c, 14d to one cache entry 4a, 4b, 4c, 4d which may comprise a page if the storage is a memory device or a track if the storage 6 is a disk drive or other non-volatile magnetic storage medium. Further, when an input/output request 5 is serviced from cache, i.e., a cache hit, then the entry 8a, 8b, 8c, 8d in the LRU linked list 6 including the pointer to the accessed cache entry 4a, 4b, 4c, 4d is moved to the top of the LRU linked list 8 by the cache manager (e.g., cache manager 615, 625, or 394 of FIG. 6). Although cache 2 is only shown as having a few cache entries 4a, 4b, 4c, 4d and corresponding entries 8a, 8b, 8c, 8d in the LRU linked list 10, in practice there can be hundreds or even thousands of cache entries and entries in the LRU linked list 10. Cache 2 further maintains a time counter 18 that is used in calculating the LRU rank 12a, 12b, 12c, 12d. In certain embodiments, bus 16 comprises one or more device adapters 161 (FIG. 1).

The LRU rank 12a, 12b, 12c, 12d can be configured to provide a value for each entry 4a, 4b, 4c, 4d in cache 2 that indicates both how frequently the entry is accessed and the time of last access. This weighting allows the cache manager (e.g., cache manager 615, 625, or 394 of FIG. 6) demoting entries 4a, 4b, 4c, 4d from cache 2 to take into account the frequency with which an entry was accessed and remove those less frequently accessed entries. Demoting relatively less frequently accessed entries increases the likelihood of a cache hit because data that has a history of being accessed more frequently is more likely to be accessed in the future over less frequently accessed entries.

Referring now to FIG. 6, host computer 390 communicates with a data storage system 100A via a plurality of communication links 630, 635, 640, and 645. In certain embodiments, data storage system 100A comprises an data storage system 100 (FIG. 1). In certain embodiments, each of physical communication links 630, 635, 640, and 645, can be configured to comprise at least 256 virtual communication pathways. Communication links 630, 635, 640, and 645, can be configured to comprise any type of I/O interface, for example, a Fibre Channel, Infiniband, Gigabit Ethernet, Ethernet, TCP/IP, iSCSI, SCSI I/O, and the like. In other embodiments, host computer 390 in communication with data storage system 100A via more than 4 communication links.

Host computer 390 communicates with an data storage system 100B via a plurality of communication links 670, 675, 680, and 685. In certain embodiments, data storage system 100B comprises a data storage system 100 (FIG. 1). In certain embodiments, each of physical communication links 670, 675, 680, and 685, can be configured to comprise at least 256 virtual communication pathways. Communication links 670, 675, 680, and 685, can be configured to comprise any type of I/O interface, for example, a Fibre Channel, Infiniband, Gigabit Ethernet, Ethernet, TCP/IP, iSCSI, SCSI I/O, and the like. In other embodiments, host computer 390 communicates with data storage system 100B via more than 4 communication links.

Data storage system 100A communicates with data storage system 100B via a plurality of communication links 650, 655, 660, and 665. In certain embodiments, each of physical communication links 650, 655, 660, and 665, can be configured to comprise at least 256 virtual communication pathways. Communication links 650, 655, 660, and 665, can be configured to comprise any type of I/O interface, for example, a Fibre Channel, Infiniband, Gigabit Ethernet, Ethernet, TCP/IP, iSCSI, SCSI I/O, and the like. In other embodiments, data storage system 100A communicates with data storage system 100B via more than 4 communication links.

During a PPRC operation, a PPRC agent handles transfers of tracks from a primary storage system to a secondary storage system. In certain embodiments, host 390 provides one or more tracks to data storage system 100A (primary storage system), and those one or more tracks are asynchronously copied to data storage system 100B (secondary storage system). In certain embodiments, host 390 provides one or more tracks to data storage system 100B (primary storage system), and those one or more tracks are asynchronously copied to data storage system 100A (secondary storage system).

In certain embodiments, Applicants' PPRC system 600 comprises a PPRC agent 392 integral with host computer 390. In certain embodiments, Applicants' PPRC system 600 comprises a PPRC agent 610 integral with storage system 100A. In certain embodiments, Applicants' PPRC system 600 comprises a PPRC agent 620 integral with storage system 100B. In certain embodiments, PPRC agent 610, and/or PPRC agent 392, and/or PPRC agent 620, generates a plurality of threads that can be executed by, for example, processor 130 (FIG. 1) and/or processor 140 (FIG. 1).

In certain embodiments, Applicants' PPRC system 600 comprises a cache manager 394 integral with host computer 390. In certain embodiments, Applicants' PPRC system 600 comprises a cache manager 615 integral with storage system 100A. In certain embodiments, Applicants' PPRC system 600 comprises a cache manager 625 integral with storage system 100B. In certain embodiments, cache manager 615, and/or cache manager 394, and/or cache manager 625, generates a plurality of threads that can be executed by, for example, processor 130 (FIG. 1) and/or processor 140 (FIG. 1).

When accessing a track for asynchronous PPRC, if the track is not already in cache, e.g., cache 134 (FIG. 1) or cache 144 (FIG. 1), the track is staged into cache to facilitate transfer of the track to the PPRC secondary. In certain embodiments, the track is placed into cache by a PPRC agent using a Track Access command. After staging the track to a cache, the PPRC agent releases control of the track using an End Track Access command. That combination of function calls primes the PPRC operation by triggering placement of all tracks to be transferred into cache before the PPRC operation begins. In alternative implementations, any other combination of appropriate function or method calls may be used to prime a track into cache.

In prior art methods, after the remote transfer is complete all transferred tracks are automatically demoted from cache, for example by setting a DEMOTABLE bit. This causes the track to always be removed from cache after the PPRC operation is complete, unless the track has been modified or there are other users waiting for the track. In some cases, this prior art method facilitates efficient operation of the cache. If a track is not demoted after completion of the PPRC, the track would remain in cache even though the track may only have been introduced into cache for the PPRC operation causing what is sometimes referred to as "cache pollution."

In many cases, the tracks being transferred in a PPRC operation are unlikely to be accessed again by other users. It is preferable that these tracks be demoted as quickly as possibly after PPRC is complete.

In some cases, though, the track being copied as part of the PPRC operation was already in cache before PPRC began. It may, for example, be a track that is accessed regularly by host computer 390 (FIGS. 1, 6). In that case, after PPRC is complete, and even if the track is unmodified, and even if that track doesn't have current users, it may be preferable that the track remain in cache rather than be demoted as there is an increased likelihood that the track will be accessed again.

Accordingly, Applicants' method determines whether a track being accessed as part of a PPRC operation was already in cache prior to that PPRC operation. If so, Applicants' method leaves the track in the cache after completing the PPRC operation. If, however, the track was not in cache prior to PPRC operation, after completing the PPRC operation Applicants' method demotes the track from cache.

Applicants' invention, therefore, includes a method to manage a data cache during data transfer. FIG. 3 summarizes one embodiment of Applicants' method. Referring to FIG. 3, in step 310 Applicants' method identifies a track to be replicated or copied as part of the PPRC operation. In certain embodiments, step 310 is performed by a PPRC agent, such as PPRC agent 610 (FIG. 6). In certain embodiments, step 310 is performed by a PPRC agent, such as PPRC agent 620 (FIG. 6). In certain embodiments, step 310 is performed by a PPRC agent, such as PPRC agent 392 (FIG. 6). In certain embodiments, a track includes a set of 4 KB segments. In certain embodiments, a track may include as many as 16 consecutive segments. At any time, some or all of those 16 segments may be present in the cache.

In step 320, Applicants' method primes the track to be transferred by calling Track Access. If the track is not already in cache, priming the track causes the track to be read into a high-speed memory cache, such as cache 134 (FIG. 1) and/or cache 144 (FIG. 1). By reading the track into cache, Applicants' method need only access tracks in the cache during the PPRC operation rather than accessing tracks written to other, slower storage devices which would otherwise delay PPRC. In certain embodiments, step 320 is performed by a PPRC agent, such as PPRC agent 610 (FIG. 6). In certain embodiments, step 320 is performed by a PPRC agent, such as PPRC agent 392 (FIG. 6). In certain embodiments, step 320 is performed by a PPRC agent, such as PPRC agent 620 (FIG. 6).

In step 330, Applicants' method determines whether the track was already in cache (a cache "hit"), or whether the track had to be read into cache from a storage device (a cache "miss") during priming. In certain embodiments, determination of step 330 is provided as a return code to Track Access. In other embodiments, the determination of step 330 is performed by a PPRC agent utilizing a file or database. In certain embodiments, the PPRC agent inspects the cache directly before priming a particular track to determine whether the track is already in cache. In certain embodiments, the PPRC agent stores the determination of whether the track was a hit or miss in memory for future use. In certain embodiments, step 330 is performed by a PPRC agent, such as PPRC agent 610 (FIG. 6). In certain embodiments, step 330 is performed by a PPRC agent, such as PPRC agent 620 (FIG. 6). In certain embodiments, step 330 is performed by a PPRC agent, such as PPRC agent 392 (FIG. 6).

To complete the priming process, Applicants' method calls End Track Access for each track to be transferred. If the track was determined in step 330 to be a cache hit, in step 340 Applicants' method agent ends track access with an instruction to a cache manager (e.g., cache manager 615, 625, or 394 of FIG. 6) that a position of the track on the LRU is not to change. If the PPRC agent were not to include this message, then the PPRC agent's execution of End Track Access might cause to track to be moved to the MRU end of the LRU list. Instead, in Applicants' method, if the track was a cache hit, the track remains in the same position in the LRU list occupied before the PPRC agent accessed the track. In certain embodiments, step 340 is performed by a PPRC agent, such as PPRC agent 610 (FIG. 6). In certain embodiments, step 340 is performed by a PPRC agent, such as PPRC agent 620 (FIG. 6). In certain embodiments, step 340 is performed by a PPRC agent, such as PPRC agent 392 (FIG. 6).

If, however, the track was determined to be a cache a miss in step 330, in step 350 Applicants' method ends track access with no such instruction. As a result, for track that are misses, the track is added to the MRU-end of the LRU list. This ensures that the track resides in cache long enough for completion of the PPRC operation. In certain embodiments, step 350 is performed by a PPRC agent, such as PPRC agent 610 (FIG. 6). In certain embodiments, step 350 is performed by a PPRC agent, such as PPRC agent 620 (FIG. 6). In certain embodiments, step 350 is performed by a PPRC agent, such as PPRC agent 392 (FIG. 6).

In step 360, the track is replicated or copied to a remote storage system (e.g., a PPRC secondary) as part of the PPRC operation. During this step, the PPRC agent again executes Track Access and uses the cached version of the track to improve PPRC performance. In certain embodiments, step 360 is performed by a PPRC agent, such as PPRC agent 610 (FIG. 6). In certain embodiments, step 360 is performed by a PPRC agent, such as PPRC agent 620 (FIG. 6). In certain embodiments, step 360 is performed by a PPRC agent, such as PPRC agent 392 (FIG. 6).

After completion of the PPRC operation, in step 370 Applicants' method again determines if the track was originally a hit in step 330, i.e., determines if the track was already in cache when the PPRC agent attempted to prime the track. In certain embodiments, step 370 is performed by a PPRC agent, such as PPRC agent 610 (FIG. 6). In certain embodiments, step 370 is performed by a PPRC agent, such as PPRC agent 620 (FIG. 6). In certain embodiments, step 370 is performed by a PPRC agent, such as PPRC agent 392 (FIG. 6).

If the method determines in step 370 that the track was a cache hit, then the method transitions to step 380 wherein the method ends access to the track with an instruction to the cache manger that the position of the track in the LRU list is not to be changed. As a result, after completing the PPRC operation, the track is located at a position within the LRU list that the track would normally have occupied due to normal system operations. As such, the track's position after completion of the PPRC operation, is unaffected by the PPRC operation. In certain embodiments, step 380 is performed by a PPRC agent, such as PPRC agent 610 (FIG. 6). In certain embodiments, step 380 is performed by a PPRC agent, such as PPRC agent 620 (FIG. 6). In certain embodiments, step 380 is performed by a PPRC agent, such as PPRC agent 392 (FIG. 6).

Alternatively, if Applicants' method determines in step 370 that the track was a cache miss in step 330, i.e., the track was not in cache when the PPRC agent attempted to prime the track, then the method transitions to step 390 wherein the method ends track access with an instruction to the cache manager (e.g., cache manager 615, 625, or 394 of FIG. 6) that the track is demotable. The cache manager may then demote or destage the track if the track is unmodified and there are no other users of the track or waiters for the track. In certain embodiments, step 390 is performed by a PPRC agent, such as PPRC agent 610 (FIG. 6). In certain embodiments, step 390 is performed by a PPRC agent, such as PPRC agent 620

(FIG. 6). In certain embodiments, step 390 is performed by a PPRC agent, such as PPRC agent 392 (FIG. 6).

In some cases, a track that was located at the LRU end of the LRU list at the time steps 320 and 330 are performed may be demoted from the cache prior to performing step 360, i.e., in the intervening period between priming the track and copying the track. In that case, in step 370 Applicants' method once again stages the track into cache. In such an embodiment, Applicants' method determines in step 370 that the track was a cache miss, and is step 390 the track is again demoted from the cache.

FIG. 4 summarizes an alternative method of managing a cache in accordance with the present disclosure. Referring to FIG. 4, in step 410 Applicants' method identifies a track to be replicated as part of the PPRC operation. In certain embodiments, a PPRC agent, such as for example PPRC agent 610 (FIG. 6), and/or PPRC agent 620, and/or PPRC agent 392, may identify the track autonomously. In certain embodiments, a host computer communicates the track data to a PPRC agent. In certain embodiments, a track includes a set of 4 KB segments. In certain embodiments, a track may include as many as 16 consecutive segments. At any time, some or all of those 16 segments may be present in the cache.

In step 420, Applicants' method primes the track to be transferred. Priming the track involves, if the track is not already in cache, reading the track data into a high-speed memory cache. In certain embodiments, step 420 comprises a PPRC agent executing various commands, such as Track Access and End Track Access. When priming the track to be transferred, the PPRC agent receives an indication from the cache manager (e.g., cache manager 615, 625, or 394 of FIG. 6) of whether the track was already in cache (a cache hit) or whether the track had to be read into cache from a storage device (a cache miss). In certain embodiments, the PPRC agent stores the determination of whether the track was a hit or miss for future use.

In certain embodiments, step 420 is performed by a PPRC agent, such as PPRC agent 610 (FIG. 6). In certain embodiments, step 420 is performed by a PPRC agent, such as PPRC agent 620 (FIG. 6). In certain embodiments, step 420 is performed by a PPRC agent, such as PPRC agent 392 (FIG. 6).

In step 430, after priming the track, the track is replicated or copied to another storage system (e.g., a PPRC secondary) as part of the PPRC operation. In certain embodiments, step 430 is performed by a PPRC agent, such as PPRC agent 610 (FIG. 6). In certain embodiments, step 430 is performed by a PPRC agent, such as PPRC agent 620 (FIG. 6). In certain embodiments, step 430 is performed by a PPRC agent, such as PPRC agent 392 (FIG. 6).

If the track was determined to be a cache hit in step 420 i.e., the track was already in cache when the PPRC agent attempted to prime the track, Applicants' method transitions to step 450 wherein the method ends access to the track with an instruction to the cache manger that the position of the track in the cache manager's LRU list is not to be changed. In certain embodiments, step 440 is performed by a PPRC agent, such as PPRC agent 610 (FIG. 6). In certain embodiments, step 440 is performed by a PPRC agent, such as PPRC agent 620 (FIG. 6). In certain embodiments, step 440 is performed by a PPRC agent, such as PPRC agent 392 (FIG. 6).

Alternatively, if the track was determined to be a cache miss in step 420, i.e., the track was not in cache when the PPRC agent attempted to prime the track, Applicants' method transitions to step 460 wherein the method ends track access with an instruction to the cache manager (e.g., cache manager 615, 625, or 394 of FIG. 6) that the track is demotable. The cache manager may then demote or destage the track if the track is unmodified and there are no other users of the track or waiters for the track.

FIG. 5 summarizes another embodiment of Applicants' method to manage a cache in accordance with the present disclosure. Referring to FIG. 5, in step 510 Applicants' method identifies a track to be replicated as part of the PPRC operation. In certain embodiments, a PPRC agent, such as for example PPRC agent 610 (FIG. 6), and/or PPRC agent 620, and/or PPRC agent 392, may identify the track autonomously. In certain embodiments, a host computer communicates the track data to a PPRC agent. In certain embodiments, a track includes a set of 4 KB segments. In certain embodiments, a track may include as many as 16 consecutive segments. At any time, some or all of those 16 segments may be present in the cache.

In step 520, Applicants' method primes the track to be transferred. Priming the track involves, if the track is not already in cache, reading the track data into a high-speed memory cache. In certain embodiments, step 420 comprises a PPRC agent executing various commands, such as Track Access and End Track Access. When priming the track to be transferred, the PPRC agent receives an indication from the cache manager (e.g., cache manager 615, 625, or 394 of FIG. 6) of whether the track was already in cache (a cache hit) or whether the track had to be read into cache from a storage device (a cache miss). If a cache hit, the indication includes an identification of the position in the LRU list held by the track. After priming the track, the track moves to the MRU position in the LRU list. The PPRC agent stores the determination of whether the track was a hit or miss and, if a hit, the position of the track in the LRU list for future use.

In certain embodiments, step 520 is performed by a PPRC agent, such as PPRC agent 610 (FIG. 6). In certain embodiments, step 520 is performed by a PPRC agent, such as PPRC agent 620 (FIG. 6). In certain embodiments, step 520 is performed by a PPRC agent, such as PPRC agent 392 (FIG. 6).

In step 530, after priming the track, the track is replicated or copied to another storage system (e.g., a PPRC secondary) as part of the PPRC operation. In certain embodiments, step 530 is performed by a PPRC agent, such as PPRC agent 610 (FIG. 6). In certain embodiments, step 530 is performed by a PPRC agent, such as PPRC agent 620 (FIG. 6). In certain embodiments, step 530 is performed by a PPRC agent, such as PPRC agent 392 (FIG. 6).

If the track was determined to be a cache hit in step 520, i.e. the track was already in cache when the PPRC agent attempted to prime the track, Applicants' method transitions to step 450 wherein the method ends access to the track with an instruction to the cache manger (e.g., cache manager 615, 625, or 394 of FIG. 6) that the position of the track in the cache should be set to the original position that was received in step 520.

Alternatively, if the track was determined to be a cache miss in step 520, i.e., the track was not in cache when the PPRC agent attempted to prime the track, Applicants' method transitions to step 560 wherein the method ends track access with an instruction to the cache manager (e.g., cache manager 615, 625, or 394 of FIG. 6) that the track is demotable. The cache manager may then demote or destage the track if the track is unmodified and there are no other users of the track or waiters for the track.

In certain embodiments, Applicants' invention includes instructions residing in the memory, such as memory 133 (FIG. 1) and/or memory 143 (FIG. 1), where those instructions are executed by PPRC agent 610, PPRC agent 620, PPRC agent 392, 310, to performed one or more of steps 320, 330, 340, 350, 360, 370, 380, and/or 390, recited in FIG. 3, and/or one or more of steps 410, 420, 430, 440, 450, and/or 460, recited in FIG. 4, and/or one or more steps 510, 520, 530, 540, 550, and/or 560, recited in FIG. 5.

In other embodiments, Applicants' invention includes instructions residing in any other computer program product, where those instructions are executed by a computer external to, or internal to, system 100, to performs any of the steps 202, 204, 206, 208, 210, 212, 214, and/or 216, recited in FIG. 3, and/or steps 302, 304, 306, 308, and/or 310, recited in FIG. 4, and/or to steps 402, 404, 406, 408, and/or 410, recited in FIG. 5. In either case, the instructions may be encoded in an information storage medium comprising, for example, a magnetic information storage medium, an optical information storage medium, an electronic information storage medium, and the like. By "electronic storage medium," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to copy data, comprising:
identifying by a peer-to-peer remote copy (PPRC) agent disposed in a host computer in communication with a first data storage system a data track to be replicated using an asynchronous peer-to-peer remote copy (PPRC) operation, wherein the data track is encoded in a non-transitory computer readable medium disposed in said first data storage system;
at a first time, determining by said PPRC agent whether the data track is stored in a data cache;
when said data track is not stored in said cache, staging by said PPRC agent said data track in said cache;
at a second time, replicating by said PPRC agent the data track from the data cache to a non-transitory computer readable medium disposed in a second data storage system, wherein the second time is later than the first time;
if the data track was stored in the data cache at the first time, instructing by said PPRC agent a cache manager to maintain the position of the track in a LRU list that the track would normally have occupied due to normal system operations; and
if the data track was not stored in the data cache at the first time, instructing by said PPRC agent the cache manager that the data track may be demoted.

2. The method of claim 1, further comprising:
assigning a different data identifier to one or more data tracks stored in the data cache at the first time; and
arranging the one or more data identifiers in a least recently used (LRU) list.

3. The method of claim 1, further comprising priming the data track in the data cache if the data track is not stored in the data cache at the first time.

4. The method of claim 3, wherein priming the data track comprises:
implementing a Track Access command;
staging the data track from a storage device to the data cache; and
implementing an End Track Access command.

5. The method of claim 4, wherein said implementing commands and said staging command are performed by a PPRC agent.

6. The method of claim 5, wherein instructing the cache manager to not modify the position of the data track in the data cache comprises forming by said PPRC agent a modified End Track Access command.

7. The method of claim 6, further comprising:
reading said modified End Track Access command by a cache manager;
not demoting said data track by said cache manager.

8. A host computer comprising a peer-to-peer remote copy ("PPRC") agent and a non-transitory computer useable medium having computer readable program code disposed therein to manage data in a data cache, wherein said host computer is in communication with a first data storage system, the computer readable program code comprising a series of computer readable program steps to effect:
identifying by said PPRC agent a data track to be replicated using a peer-to-peer remote copy (PPRC) operation, wherein the data track is encoded in a non-transitory computer readable medium disposed in said first data storage system;
at a first time, determining by said PPRC agent whether the data track is stored in a data cache;
when said data track is not stored in said cache, staging by said PPRC agent said data track in said cache;
at a second time, replicating by said PPRC agent the data track from the data cache to a non-transitory computer readable medium disposed in a second data storage system, wherein the second time is later than the first time;
if the data track was stored in the data cache at the first time, instructing by said PPRC agent a cache manager to not demote the data track from the data cache; and
if the data track was not stored in the data cache at the first time, instructing by said PPRC agent the cache manager that the data track may be demoted.

9. The article of manufacture of claim 8, the computer readable program code further comprising a series of computer readable program steps to effect:
assigning a different data identifier to one or more data tracks stored in the data cache at the first time; and
arranging the one or more data identifiers in a least recently used (LRU) list.

10. The article of manufacture of claim 8, the computer readable program code further comprising a series of computer readable program steps to effect priming the data track in the data cache if the data track is not stored in the data cache at the first time.

11. The article of manufacture of claim 10, wherein the computer readable program code to prime the data track further comprises computer readable program code comprising a series of computer readable program steps to effect:
implementing a Track Access command;
staging the data track from a storage device to the data cache; and
implementing an End Track Access command.

12. The article of manufacture of claim 11, further comprising a PPRC agent, wherein said implementing and said staging are performed by the PPRC agent.

13. The article of manufacture of claim 12, wherein the computer readable program code to instruct the cache manager to not modify the position of the data track in the data cache further comprises computer readable program code comprising a series of computer readable program steps to effect forming by said PPRC agent a modified End Track Access command.

14. The article of manufacture of claim 13, the computer readable program code further comprising a series of computer readable program steps to effect:

reading said modified End Track Access command by a cache manager;
not demoting said data track by said cache manager.

15. A computer program product encoded in a non-transitory computer readable medium disposed in a host computer comprising a peer-to-peer remote copy (PPRC) agent and in communication with a first data storage system, said computer program product being useable with said programmable computer processor to copy data, comprising:
  computer readable program code which causes said PPRC agent to identify a data track to be replicated using a peer-to-peer remote copy (PPRC) operation, wherein the data track is encoded in a non-transitory computer readable medium disposed in a first data storage system;
  computer readable program code which causes said PPRC agent to at a first time, determine whether the data track is stored in a data cache;
  computer readable program code which, when said data track is not stored in said cache, causes said PPRC agent to stage said data track in said cache;
  computer readable program code which causes said PPRC agent, to at a second time, replicate the data track from the data cache to a non-transitory computer readable medium disposed in a second data storage system, wherein the second time is later than the first time;
  computer readable program code which, if the data track was stored in the data cache at the first time, causes said PPRC agent to instruct a cache manager to not demote the data track from the data cache; and
  computer readable program code which, if the data track was not stored in the data cache at the first time, causes said PPRC agent to instruct the cache manager that the data track may be demoted.

16. The computer program product of claim 15, further comprising:
  computer readable program code which causes said programmable computer processor to assign a different data identifier to one or more data tracks stored in the data cache at the first time; and
  computer readable program code which causes said programmable computer processor to arrange the one or more data identifiers in a least recently used (LRU) list.

17. The computer program product of claim 8, further comprising computer readable program code which causes said programmable computer processor to prime the data track in the data cache if the data track is not stored in the data cache at the first time.

18. The computer program product of claim 10, wherein the computer readable program code to prime the data track further comprises:
  computer readable program code which causes said programmable computer processor to implement a Track Access command;
  computer readable program code which causes said programmable computer processor to stage the data track from a storage device to the data cache; and
  computer readable program code which causes said programmable computer processor to implement an End Track Access command.

19. The computer program product of claim 18, wherein the computer readable program code to instruct the cache manager to not modify the position of the data track in the data cache further comprises computer readable program code which causes said programmable computer processor to form a modified End Track Access command.

20. The computer program product of claim 19, further comprising:
  computer readable program code which causes said programmable computer processor to read said modified End Track Access command;
  computer readable program code which causes said programmable computer processor to not demote said data track.

* * * * *